United States Patent
Choi

(10) Patent No.: US 10,603,585 B2
(45) Date of Patent: Mar. 31, 2020

(54) DISPLAY APPARATUS AND DISPLAY BENDING METHOD THEREOF

(71) Applicant: SAMSUNG ELECTRONICS CO., LTD., Suwon-si (KR)

(72) Inventor: Myoung-sang Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 655 days.

(21) Appl. No.: 14/861,331

(22) Filed: Sep. 22, 2015

(65) Prior Publication Data

US 2016/0121213 A1    May 5, 2016

(30) Foreign Application Priority Data

Oct. 31, 2014  (KR) .......................... 10-2014-0150509

(51) Int. Cl.
| | |
|---|---|
| *A63F 13/428* | (2014.01) |
| *A63F 13/211* | (2014.01) |
| *A63F 13/803* | (2014.01) |
| *G06F 1/16* | (2006.01) |
| *G06F 3/147* | (2006.01) |
| *A63F 13/28* | (2014.01) |

(52) U.S. Cl.
CPC .......... *A63F 13/428* (2014.09); *A63F 13/211* (2014.09); *A63F 13/28* (2014.09); *A63F 13/803* (2014.09); *G06F 1/1652* (2013.01); *G06F 3/147* (2013.01); *G06F 1/1601* (2013.01); *G09G 2380/02* (2013.01)

(58) Field of Classification Search
CPC ........ G06F 3/147; G06F 1/1652; G06F 3/041; A63F 13/28
See application file for complete search history.

(56) References Cited

U.S. PATENT DOCUMENTS

| | | | |
|---|---|---|---|
| 2007/0152692 A1 | 7/2007 | Kinsley | |
| 2007/0152962 A1* | 7/2007 | Kim | A63F 13/10 345/156 |
| 2010/0011291 A1* | 1/2010 | Nurmi | G06F 3/0414 715/702 |
| 2011/0134144 A1* | 6/2011 | Moriwaki | G09G 3/3208 345/660 |
| 2012/0075166 A1 | 3/2012 | Marti et al. | |
| 2013/0215088 A1* | 8/2013 | Son | G09G 5/40 345/204 |

(Continued)

FOREIGN PATENT DOCUMENTS

EP    2 809 068 A1    12/2014

OTHER PUBLICATIONS

European Office Action dated Jun. 8, 2017 in corresponding European Patent Application No. 15190038.8.

(Continued)

*Primary Examiner* — Abbas I Abdulselam
(74) *Attorney, Agent, or Firm* — Staas & Halsey LLP

(57) ABSTRACT

A display apparatus is provided. The display apparatus includes a display configured to be bendable; and a processor configured to detect a speed value of an object of a content provided through the display, determine a curvature value at which the display is to be bent according to the detected speed value of the object, and change a curvature of the display based on the determined curvature value.

16 Claims, 10 Drawing Sheets

(56) References Cited

U.S. PATENT DOCUMENTS

| | | | |
|---|---|---|---|
| 2013/0265221 A1* | 10/2013 | Lee | G06F 3/01 |
| | | | 345/156 |
| 2013/0300686 A1* | 11/2013 | Yoon | G06F 3/041 |
| | | | 345/173 |
| 2014/0118910 A1* | 5/2014 | Sung | G09F 9/301 |
| | | | 361/679.01 |
| 2014/0307395 A1* | 10/2014 | An | G06F 1/1652 |
| | | | 361/749 |
| 2014/0320400 A1* | 10/2014 | Jiang | G06F 3/016 |
| | | | 345/156 |

OTHER PUBLICATIONS

Extended European Search Report dated Mar. 11, 2016 in corresponding corresponding European Patent Application No. 15190038.8.

Indian Office Action dated Apr. 22, 2019 in corresponding Indian Patent Application No. 3199/DEL/2015.

* cited by examiner

DISPLAY APPARATUS AND DISPLAY BENDING METHOD THEREOF

CROSS-REFERENCE TO RELATED APPLICATIONS

This application claims priority under 35 U.S.C. § 119 from Korean Patent Application No. 10-2014-0150509, filed on Oct. 31, 2014, in the Korean Intellectual Property Office, the disclosure of which is incorporated herein by reference in its entirety.

BACKGROUND

1. Field

The present general inventive concept generally relates to providing a display apparatus and a display bending method thereof, and more particularly, to providing a display apparatus that changes a curvature of a display, and a display bending method thereof.

2. Description of the Related Art

The development of electronic technologies has brought the development of display apparatuses having various functions.

In particular, there has been recently developed a display apparatus including a display having left and right sides that may be bent according to a user manipulation. A bendable display as described above may improve an immersion of a user in a display apparatus than a flat type display, and thus demands for bendable displays have gradually increased.

Therefore, there is a need for methods of maximizing effects of display apparatuses having functions of bending displays in relation to game contents that are currently variously provided.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a display apparatus that changes a curvature of a display according to a speed value of an object of a content, and a display bending method thereof.

According to an aspect of the exemplary embodiments, there is provided a display apparatus including: a display configured to be bendable; and a processor configured to detect a speed value of an object of a content provided through the display, determine a curvature value at which the display is to be bent according to the detected speed value of the object, and change a curvature of the display based on the determined curvature value.

The processor may analyze a speed indicator of a graphic user interface (GUI) provided by the game to determine the speed value of the object.

The processor may detect the speed value of the object over a time and determine the curvature value by using the speed value of the object detected for the time.

The processor may map a speed interval between a minimum speed value and a maximum speed value of the object detected over the time on a curvature interval between a minimum curvature value and a maximum curvature value of the display, and change a curvature of the display based on a curvature value mapped to the detected speed value of the object.

The processor may change the curvature of the display so as to enable a left side and a right side of the display to have different curvature values according to a direction of the object moving at the detected speed value.

The processor may change the curvature of the display so as to enable the right side of the display to have a curvature value larger than a curvature value of the left side of the display while the object is moving to the left side, and change the curvature of the display so as to enable the curvature value of the left side of the display to be larger than the curvature value of the right side of the display while the object is moving to the right side.

The content may be a racing game content, and the speed value of the object is changeable in the racing game content according to a user command.

According to another aspect of the exemplary embodiments, there is provided a method of bending a display of a display apparatus, the method including: detecting a speed value of an object of a content provided through the display; and determining a curvature value at which the display is to be bent according to the detected speed value of the object and changing a curvature of the display based on the determined curvature value.

The content provided through the display may be of a game, and the detecting of the speed of the object may include: analyzing a speed indicator of a GUI provided by the game to detect the speed value of the object.

The changing of the curvature of the display may include: detecting the speed value of the object for over a time and determining the curvature value by using the speed value of the object detected for the time.

The changing of the curvature of the display may include: mapping a speed interval between a minimum speed value and a maximum speed value of the object detected over the time on a curvature interval between a minimum curvature value and a maximum curvature value of the display, and changing the curvature of the display based on a curvature value mapped to the detected speed value of the object.

The method may further include: changing the curvature of the display so as to enable a left side and a right side of the display to have different curvature values according to a direction of the object moving at the detected speed value.

The changing of the curvature of the display may include: changing the curvature of the display so as to enable the right side of the display to have a curvature value larger than a curvature value of the left side of the display while the object is moving to the left side and changing the curvature of the display so as to enable the curvature value of the left side of the display to be larger curvature value than the curvature value of the right side of the display while the object is moving to the right side.

The game content may be a racing game content, and the speed value of the object is changeable in the racing game content according to a user command.

According to various exemplary embodiments of the present general inventive concept, a curvature of a display may be changed according to a speed of an object of a game content. In particular, the display may be gradually bent with an increase in the speed of the object of the game content. Therefore, an immersion of a user in the game content may be increased, and a dynamic game environment may be provided.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
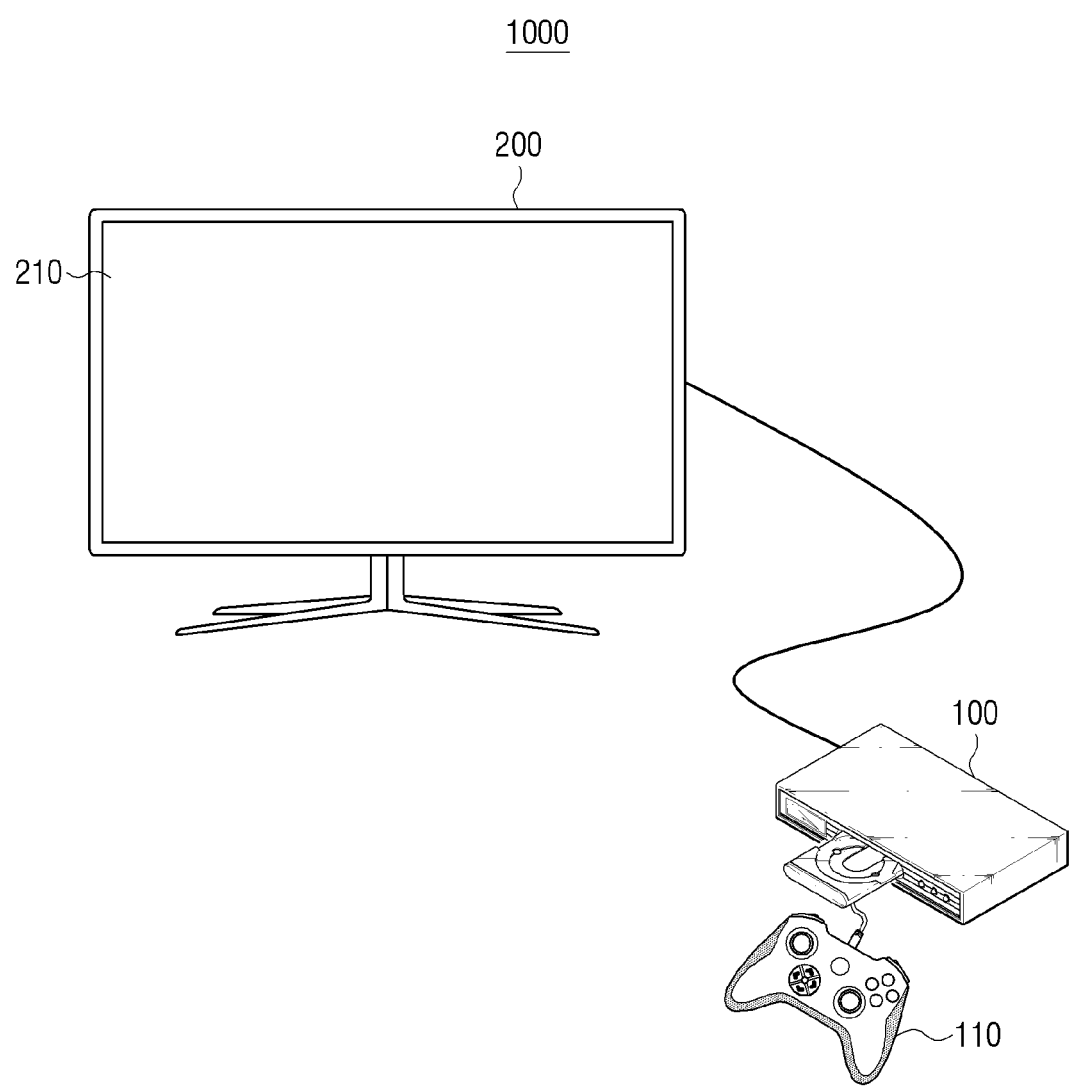
FIG. 1 is a view illustrating a display system according to an exemplary embodiment of the present general inventive concept.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

The terms "first", "second", etc. may be used to describe diverse components, but the components are not limited by the terms. The terms are only used to distinguish one component from the others.

The terms used in the present application are only used to describe the exemplary embodiments, but are not intended to limit the scope of the disclosure. The singular expression also includes the plural meaning as long as it does not differently mean in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

In the exemplary embodiment of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Hereinafter, the present disclosure will be described in detail with reference to the accompanying drawings.

FIG. 1 is a view illustrating a display system according to an exemplary embodiment of the present general inventive concept. Referring to FIG. 1, the display system 1000 includes a video game machine 100 and a display apparatus 200.

The video game machine 100 executes a game program that is pre-stored or recorded on a recording medium to transmit a game content to the display apparatus 200 to which the video game machine 100 is connected by wire or wireless connection.

The display apparatus 200 may output the game content provided from the video game machine 100. In other words, the display apparatus 200 may output a game content image and a game content sound provided from the video game machine 100.

In this case, a user may control an object, which is displayed on a game content screen, through a controller 110 connected to the video game machine 100.

For example, if a game content is a racing game content, an object may be an object having a speed that is changeable in the racing game content according to a user command, e.g., may be a car, a motorcycle, or the like. In this case, the user may control a speed, a movement direction, etc. of the object displayed on a racing game content screen by using a direction key, a manipulation button, or the like of the controller 110.

A display 210 provided in the display apparatus 200 may be bent. In other words, the display 210 may be bent so as to enable left and right sides thereof to have uniform curvatures in a flat state.

Here, a curvature is a value indicating a bent degree of a curve, and thus the bent degree of the curve increases with an increase in a curvature value but decreases with a decrease in the curvature value.

In this case, the display apparatus 200 may change a curvature of the display 210 according to the speed of the object of the game content.

In detail, the display apparatus 200 may determine a curvature value at which the display 210 is bent and change the curvature of the display 210 based on the determined curvature value.

For example, the display apparatus 200 may change the curvature of the display 210 so as to enable the display 210 to have a larger curvature value with an increase in the speed of the object of the game content. Alternatively, the display apparatus 200 may change the curvature of the display 210 so as to enable the display 210 to have a smaller curvature value with a decrease in the speed of the object of the game content.

The display apparatus 200 may also change the curvature of the display 210 according to the movement direction of the object of the game content.

In detail, the display apparatus 200 may change the curvature of the display 210 so as to enable the left and right sides of the display 210 to have different curvature values according to a change in the movement direction of the object of the game content.

For example, if the object of the game content moves in a left direction, the display apparatus 200 may change the curvature of the display 210 so as to enable the right side of the display 210 to have a larger curvature value than the left side of the display 210. If the object of the game content moves in a right direction, the display apparatus 200 may change the curvature of the display 210 so as to enable the left side of the display 210 to have a larger curvature value than the right side of the display 210.

A method of changing the curvature of the display 210 according to the speed and the movement direction of the object of the game content through the display apparatus 200 will be described in detail.

Figure 2A:
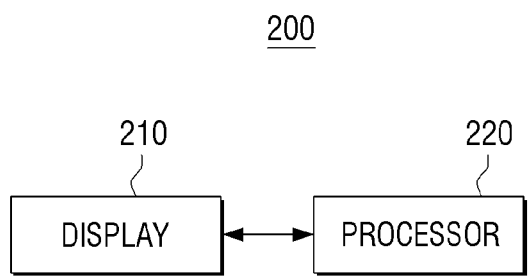
FIGS. 2A and 2B are block diagrams illustrating a structure of a display apparatus according to an exemplary embodiment of the present general inventive concept.

FIG. 2A is a block diagram illustrating a structure of a display apparatus 200 according to an exemplary embodiment of the present general inventive concept. Referring to FIG. 2A, the display apparatus 200 includes a display 210 and a processor 220.

The display 210 displays various types of screens. For example, the display 210 may display a game content screen provided from the video game machine 100.

The display 210 may also be realized to be bent. For example, left and right sides of the display 210 may be bent. In this case, the display 210 may be bent so as to enable the left and right sides thereof to have the same curvature value or different curvature values.

The processor 220 controls an overall operation of the display apparatus 200. The processor 220 may include a central processing unit (CPU), and a random access memory (RAM) and a read only memory (ROM) for an operation of the display apparatus 220. In this case, these modules may be realized as System on Chip (SoC) types.

The processor 220 may control to output a game content provided from the video game machine 100.

In detail, the processor 220 may display a game content image, which is provided from the video game machine 100, through the display 210 and output a game content sound, which is provided from the video game machine 100, through an audio output unit (not shown).

The processor 220 detects a speed of an object of the game content provided through the display 210.

For example, as shown in FIGS. 3A through 3D, if the game content is a racing game content, a speed indicating graphic user interface (GUI) that indicates a speed of an object is displayed in a three-digit number to be close to a speedometer (i.e., a scale plate showing a speed, at which an object is moving, as a distance per time) in upper and/or lower areas of left and/or right sides of a racing game content screen or in upper and/or lower areas of a center of the racing game content screen.

Therefore, the processor 220 may analyze the speed indicating GUI included on the racing game content screen to detect the speed of the object.

For example, the processor 220 may analyze the racing game content screen to detect the three-digit number, which is displayed to be close to the speedometer in an area of the racing game content screen, and determine the speed of the object of the racing game content based on the detected number value.

However, the above-described method is only an exemplary embodiment, and thus the processor 220 may detect the speed of the object through various methods.

For example, in case of the racing game content, the speed of the object is changed according to a user manipulation. Therefore, a number that indicates the speed of the object on the racing game content screen has a larger variability than other numbers included on the racing game content screen.

Therefore, the processor 220 may analyze the racing game content screen to detect a number having a large variability for a preset time and determine the speed of the object of the racing game content based on the detected number value.

The processor 220 may also determine a curvature value at which the display 210 is bent according to the detected speed of the object and change the curvature of the display 210 based on the determined curvature value.

For this, the processor 220 may detect the speed of the object for a preset time and determine a curvature value by using the speed of the object detected for the preset time.

In detail, the processor 220 may map a speed interval between minimum and maximum speeds of the object detected for the preset time on a curvature interval between minimum and maximum curvature values of the display 210 and change the curvature of the display 210 based on a curvature value mapped on the detected speed of the object according to the mapping result.

In other words, the processor 220 detects a speed of the object for a preset time after the game content is executed to determine a speed value that the object that may have on the game content.

Also, the processor 220 may respectively map minimum and maximum speeds of an object detected for a preset time on minimum and maximum curvature values at which the display 210 may be bent. If a speed of the object, which is detected when the game content is executed, is the minimum speed detected for the preset time, the processor 220 may bend the left and right sides of the display 210 by a curvature value mapped on the corresponding speed, i.e., by the minimum curvature value. If the detected speed of the object is the maximum speed detected for the preset time, the processor 220 may bend the left and right sides of the display 210 by a curvature value mapped on the corresponding speed, i.e., by the maximum curvature value.

The processor 220 may map a speed interval between minimum and maximum speeds of the object detected for a preset time on a curvature interval between minimum and maximum curvature values at which the display 210 may be bent. If a speed of the object, which is detected when the game content is executed, exists in the speed interval between the minimum and maximum speeds of the object detected for the preset time, the processor 220 may determine a curvature value of the display 210, which corresponds to the speed of the object existing in the speed interval, in the curvature interval between the minimum and maximum curvature values at which the display 210 may be bent.

In detail, if the speed of the object, which is detected when the game content is executed, exists between the minimum and maximum speeds of the object detected for the preset time, the processor 220 may determine a curvature value corresponding to the detected speed of the object based on a relative ratio between a difference between the minimum speed and the detected speed and a difference between the maximum speed and the detected speed.

In other words, the processor 220 may apply the relative ratio between the difference between the minimum speed and the detected speed and the difference between the maximum speed and the detected speed to the curvature interval between the minimum and maximum curvature values. Therefore, the processor 220 may determine a curvature value, which satisfies the relative ratio between the difference between the minimum speed and the detected speed and the difference between the maximum speed and the detected speed, as a curvature value corresponding to the detected speed of the object.

For example, the speed of the object may increase from 0 km/h to 80 km/h, decrease to 50 km/h, and then increase to 120 km/h for 30 seconds after the racing game content is executed.

In this case, the processor 220 may analyze the racing game content screen to determine a minimum speed of the object detected for 30 seconds as 0 km/h and a maximum speed of the object detected for 30 seconds as 120 km/h.

If the display 210 has a maximum curvature value $\beta$ when the display 210 is maximally bendable at a minimum curvature value $\alpha$ in a unbendable state, i.e., in a flat state ($\alpha<\beta$), the processor 220 may map the minimum speed 0 km/h detected for 30 seconds on the minimum curvature value $\alpha$, map the maximum speed 120 km/h on the maximum curvature value $\beta$, and map a speed interval between 0 km/h and 120 km/h on a curvature interval between the minimum curvature value α and the maximum curvature value β.

The processor 220 may detect a speed of the object when the game content is executed, if the detected speed of the object is 0 km/h, make the display 210 flat so as to enable the display 210 to have the curvature value α mapped on the corresponding speed. If the detected speed of the object is 120 km/h, the processor 220 may bend the left and right sides of the display 210 so as to enable the display 210 to have the curvature value β mapped on the corresponding speed.

If the speed of the object, which is detected when the game content is executed, exists in a speed interval between 0 km/h and 120 km/h, the processor 220 may determine a curvature value satisfying a relative ratio between a difference between 0 km/h and the detected speed of the object and a difference between 120 km/h and the detected speed of the object within the minimum curvature value α and the maximum curvature value β, and bend the left and right sides of the display 210 so as to enable the display 210 to have the determined curvature value.

For example, if the speed of the object, which is detected when the game content is executed, is 30 km/h, the relative ratio between the difference between the detected speed of the object and 0 km/h and the difference between 120 km/h and the detected speed of the object is 1:3. In this case, the processor 220 may determine a curvature value, at which a relative ratio between minimum and maximum curvature values is 1:3 within a curvature interval between α and β, as a curvature value at which the speed of the object is 30 km/h and bend the left and right sides of the display 210 so as to enable the display 210 to have the determined curvature value. Here, the determined curvature value may have a value between the minimum curvature value α and the maximum curvature value β.

As described above, the processor 220 may determine a curvature value corresponding to the speed of the object detected when the game content is executed and bend the left and right sides of the display 210 according to the determined curvature value.

In particular, if the speed of the object of the game content is minimum, the processor 220 makes the display 210 into a flat state. Also, the processor 220 gradually bends the display 210 with an increase in the speed of the object and bends the display 210 so as to enable the display 210 to have a maximum curvature value when the speed of the object is maximum.

As described above, since the left and right sides of the display 210 become closer to the user with an increase in the speed of the object, an immersion of the user may be improved. Also, a phenomenon where a peripheral screen passes fast when the object moves fast may be transmitted to the user, and thus a dynamic game environment may be provided.

In the above-described example, a maximum speed of an object detected for a preset time is regarded as a maximum speed of the object in a game content to bend the display 210.

However, a speed of the object detected after a preset time elapses may become higher than a maximum speed of the object detected for a preset time.

As described above, if the speed of the object, which is detected when the game content is executed, becomes higher than the maximum speed of the object detected for the preset time, the processor 220 may determine a curvature value corresponding to the corresponding speed as a curvature value mapped on the maximum speed of the object detected for the preset time and bend the left and right sides of the display 210 so as to enable the display 210 to have the determined curvature value.

In the above-described example, if the speed of the object, which is detected when the game content is executed, is 140 km/h, the processor 220 may determine a curvature value, at which the display 210 is bent according to the corresponding speed, as a curvature value β mapped on the maximum speed 120 km/h detected for 30 seconds and bend the left and right sides of the display 210 so as to enable the left and right sides of the display 210 to each have the curvature value β.

The processor 220 may bend the display 210 according to the speed and a movement direction of the object.

In this case, the processor 220 may change a curvature of the display 210 according to the movement direction of the object so as to enable the left and right sides of the display 210 to have different curvature values. In other words, the processor 220 may bend the left and right sides of the display 210 according to the movement direction of the object so as to enable the left and right sides of the display 210 to have different bending degrees.

For this, the processor 220 may detect a movement direction of the object of the game content.

For example, if the object of the racing game content moves to the left side according to a user manipulation, a left side of the object is more much displayed on a game content screen than before the object moves. If the object moves to the right side, a right side of the object is more much displayed than before the objects moves.

Therefore, the processor 220 may analyze a shape of the object on the game content screen to detect a movement direction of the object.

For example, the processor 220 may analyze the racing game content screen, if the left side of display of the object is relatively displayed, for example, to have higher curvature value, determine that the object moves to the left side, and if the right side of display of the object is relatively displayed to have higher curvature value, determine that the object moves to the right side.

However, this is only an exemplary embodiment, and thus the processor 220 may determine a movement direction of the object through various methods.

For example, the object of the racing game content moves along a road. Therefore, the processor 220 may analyze the racing game content screen to detect the road, a sculpture around the road, or the like and detect a movement direction of the object based on a bending direction of the detected road and a movement position of the sculpture.

The processor 220 may also change the curvature of the display 210 according to a movement direction of the object so as to enable the left and right sides of the display 210 to have different curvature values.

In detail, if the object moves to the left side, the processor 220 may change the curvature of the display 210 so as to enable the right side of the display 210 to have a larger curvature value than the left side of the display 210. If the object moves to the right side, the processor 220 may change the curvature of the display 210 so as to enable the left side of the display 210 to have a larger curvature value than the right side of the display 210.

In other words, the processor 220 may respectively bend the left and right sides of the display 210 so as to enable the right side of the display 210 to be more bent than the left side of the display 210 if the object moves to the left side and so as to enable the left side of the display 210 to be more bent than the right side of the display 210 if the object moves to the right side.

For this, the processor 220 may determine curvature values at which the left and right sides of the display 210 are respectively bent according to a movement direction of the object.

In detail, if the object moves to the left side, the processor 220 may determine a curvature value of the right side of the display 210 so as to be relatively larger than a curvature value of the left side of the display 210. If the object moves to the right side, the processor 220 may determine a curvature value of the left side of the display 210 so as to be relatively larger than a curvature value of the right side of the display 210.

Therefore, the processor 220 may bend the left and right sides of the display 210 based on the determined curvature value so as to enable the right side of the display 210 to have a relatively larger curvature value than the left side of the display 210 if the object moves to the left side and so as to enable the left side of the display 210 to have a relatively larger curvature value than the right side of the display 210 if the object moves to the right side.

As described above, since a screen around an object becomes closer to the user according to a movement direction of the object through bending of the display 210, an immersion of the user may be improved.

Only if a preset user command is input, the processor 220 may detect a speed and a movement direction of the object of the game content and bend the display 210 according to the detection result. Here, the preset user command may be a user command for setting a mode (hereinafter referred to as a racing game mode) for changing a curvature of the display 210 according to a speed and a movement direction of an object.

Therefore, if the racing game mode is set according to the user command, the processor 220 may detect a speed and a movement direction of the object and bend the display 210 according to a detection result.

Figure 2B:
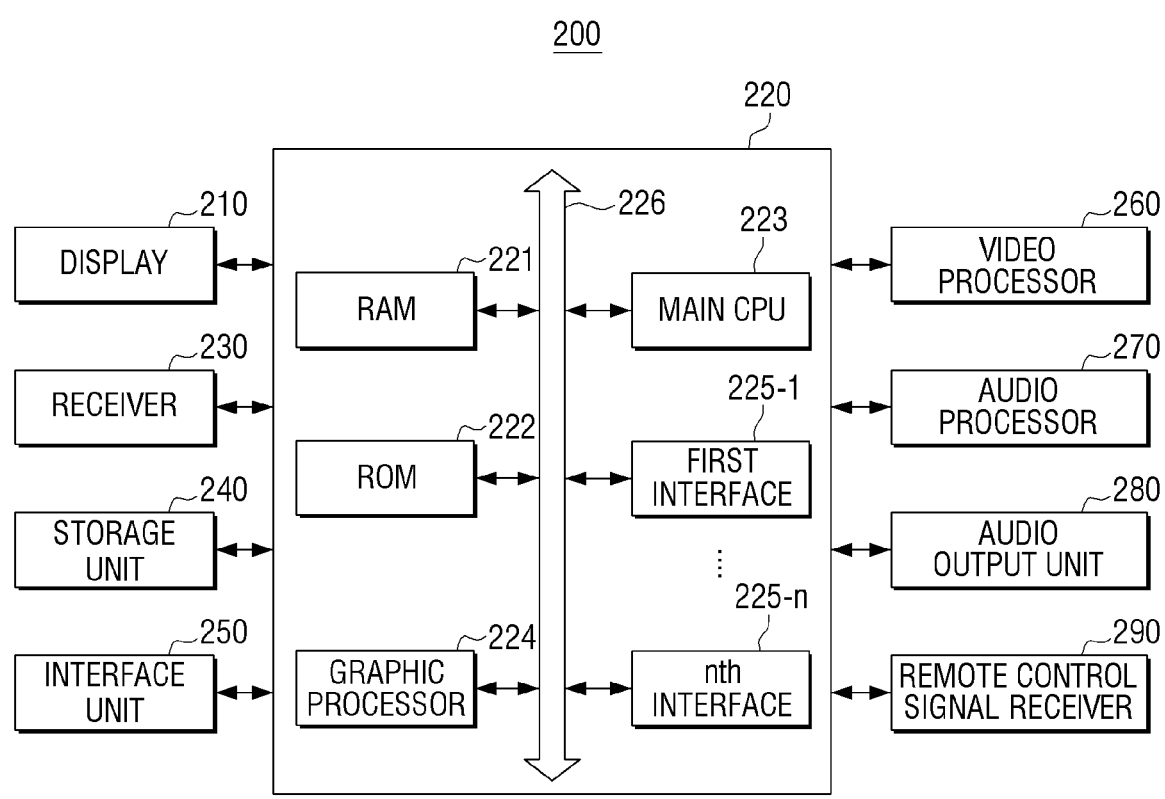
Figure 3A:
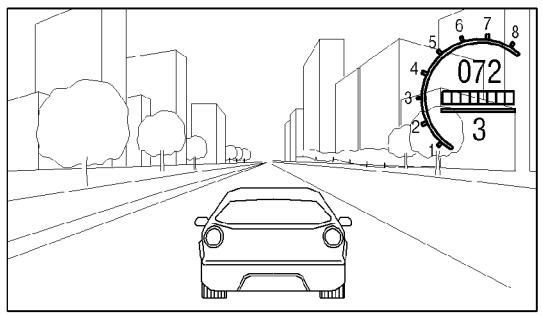
FIGS. 3A, 3B, 3C and 3D (3A through 3D) are views illustrating a racing game screen according to an exemplary embodiment of the present general inventive concept.
Figure 3B:
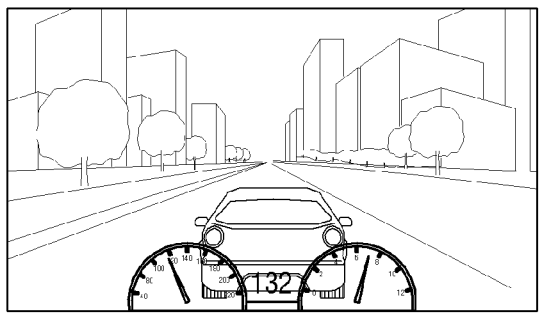
Figure 3C:
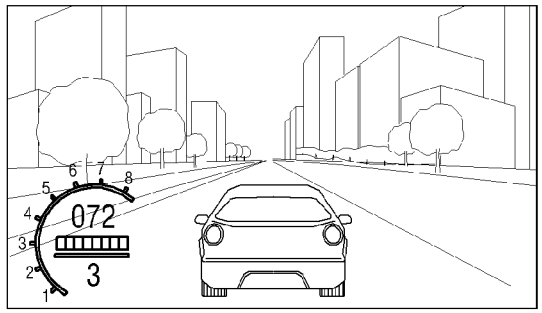
Figure 3D:
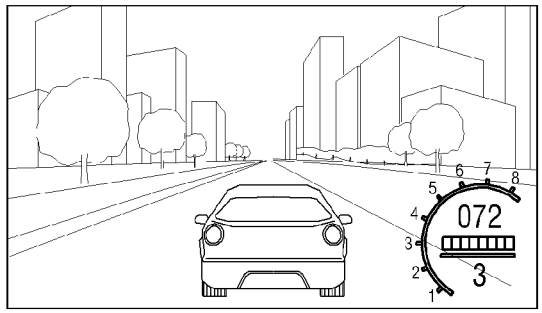

FIG. 2B is a block diagram illustrating a detailed structure of the display apparatus 200 of FIG. 2A. Referring to FIG. 2B, the display apparatus 200 includes the display 210, the processor 220, a receiver 230, a storage unit 240, an interface unit 250, a video processor 260, an audio processor 270, an audio output unit 280, and a remote control signal receiver 290.

Detailed descriptions of elements of FIG. 2B overlapping with elements of FIG. 2A are omitted.

The processor 220 controls an overall operation of the display apparatus 200.

In detail, the processor 220 includes a random access memory (RAM) 221, a read only memory (ROM) 222, a main CPU 223, a graphic processor 224, first through $n^{th}$ interfaces 225-1 through 225-n, and a bus 226.

The RAM 221, the ROM 222, the main CPU 223, the graphic processor 224, the first through $n^{th}$ interfaces 225-1 through 225-n, etc. may be connected to one another through the bus 226.

The first through $n^{th}$ interfaces 225-1 through 225-n are connected to various types of elements as described above.

The main CPU 223 accesses the storage unit 240 to perform booting by using an operating system (O/S) stored in the storage unit 240. The main CPU 223 also performs various types of operations by using various types of programs, contents, data, etc. stored in the storage unit 240.

The ROM 222 stores a command set for booting a system, etc. If power is supplied through an input of a turn-on command, the main CPU 223 copies the O/S stored in the storage unit 240 into the RAM 221 according to a command stored in the ROM 222 and executes the O/S to boot the system. If the system is completely booted, the main CPU 223 copies various types of application programs stored in the storage unit 240 into the RAM 221 and executes the application programs copied into the RAM 221 to perform various types of operations.

The graphic processor 224 generates a screen including various types of objects, such as an icon, an image, a text, etc., by using an arithmetic operator (not shown) and a renderer (not shown). The arithmetic operator calculates attribute values such as coordinate values at which objects will be respectively displayed, shapes, sizes, and colors of the objects, etc. according to a layout of a screen based on a received control command. The renderer generates a screen of various layouts including an object based on the attribute values calculated by the arithmetic operator. The screen generated by the renderer is displayed in a display area of the display 210.

An operation of the processor 220 that has been described above may be performed by a program stored in the storage unit 240.

The storage unit 240 stores various types of data such as an O/S software module for driving the display apparatus 200, various types of multimedia contents, etc.

In particular, the storage unit 240 may store an application program for detecting a speed and a movement direction of an object on the game content screen. Therefore, if the game content is provided from the video game machine 100 when the racing game mode is set, the processor 220 may copy a corresponding application program into the RAM 221 and executes the application program to detect the speed and the movement direction of the object included on the game content screen.

The receiver 230 may receive a broadcast content (or a broadcast signal). The broadcast content may include an image, an audio, and additional data (e.g., an electronic program guide (EPG)), and the receiver 230 may receive the broadcast content from various types of sources such as terrestrial broadcasting, cable broadcasting, satellite broadcasting, Internet broadcasting, etc.

For example, the receiver 230 may be realized to include elements, such as a tuner (not shown), a demodulator (not shown), an equalizer (not shown), etc., to receive the broadcast content from a broadcasting station.

The interface unit 250 connects the display apparatus 200 to an external apparatus. In particular, the interface unit 250 may be realized as an input port (not shown) or a wireless communication module (not shown) for connecting the video game machine 100 to the display apparatus 200 by wire or wireless so as to receive the game content from the video game machine 100.

The video processor 260 processes video data. In detail, the processor 220 may control the video processor 260 to process various types of video data provided from the receiver 230 and the interface unit 250 so as to display the various types of video data through the display 210.

For example, the video processor 260 may perform processing, such decoding, scaling, a frame rate conversion, etc., on video data provided from the interface unit 250 to signal-process the game content screen in a form that the display 210 may output.

The audio processor 270 processes audio data. In detail, the processor 220 may control the audio processor 270 to process various types of audio data provided from the receiver 230 and the interface unit 250 so as to output the various types of audio data through the audio output unit 280.

For example, the audio processor 270 may perform signal-processing, such as decoding, etc., on audio data provided from the interface unit 250 to perform signal-processing on game content audio in a form that the audio output unit 280 may output.

The audio output unit 280 may convert an audio signal output from the audio processor 270 into a sound and output the sound through a speaker (not shown) or may output the sound to an external apparatus connected to the display apparatus 200 through an external output terminal (not shown).

The remote control signal receiver 290 receives a remote control signal from a remote controller (not shown).

In particular, the remote control signal receiver 290 may receive a remote control signal for setting the display apparatus 200 into the racing game mode. In this case, the processor 220 may set the display apparatus 200 into the racing game mode according to the received remote control signal and detect a speed and a movement direction of the object of the game content so as to change a curvature of the display 210.

Although not shown in FIG. 2B, the display apparatus 200 may further include a curvature motor (not shown) that bends the left and right sides of the display 210 from a flat state into a curved state.

In this case, the processor 220 may control the curvature motor to apply a pressure to the display 210 according to a rotation amount of the curvature motor so as to change the curvature of the display 210 according to the speed and the movement direction of the object of the game content.

FIGS. 4A through 5B are views illustrating a change in a curvature of a display according to an exemplary embodiment of the present general inventive concept. For convenience of description, a racing game content will be described as being executed.

Figure 4A:
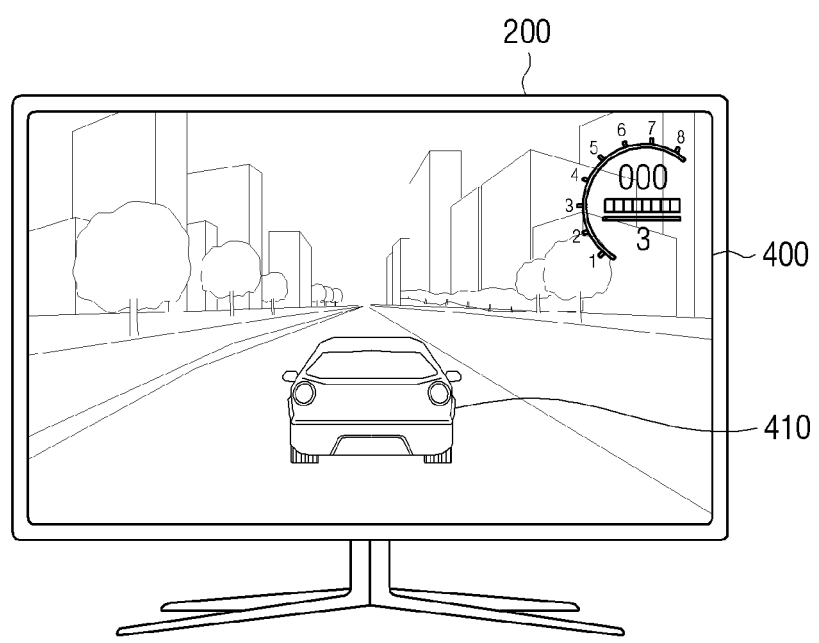
FIGS. 4A, 4B, 4C, 5A and 5B (4A through 5B) are views illustrating a change in a curvature of a display according to an exemplary embodiment of the present general inventive concept.
Figure 4B:
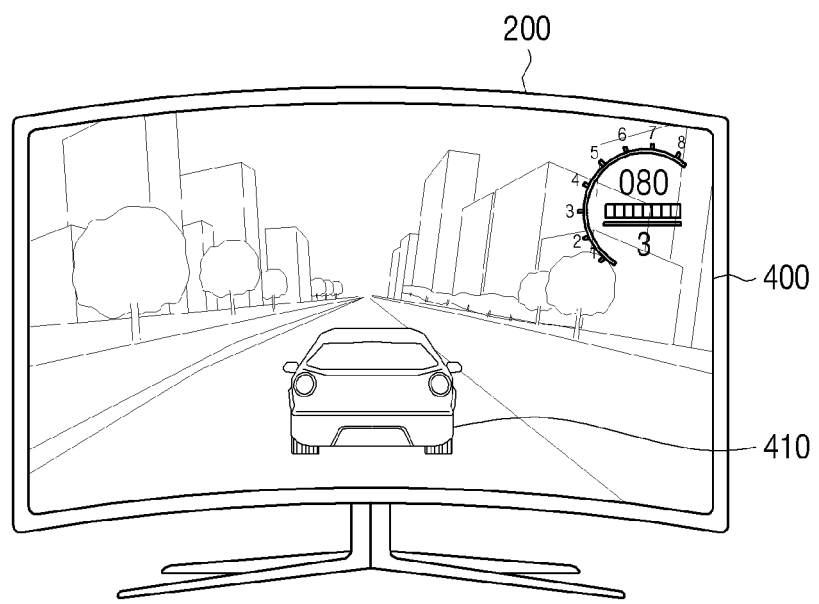
Figure 4B:
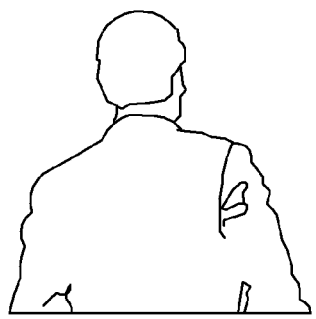
Figure 4C:
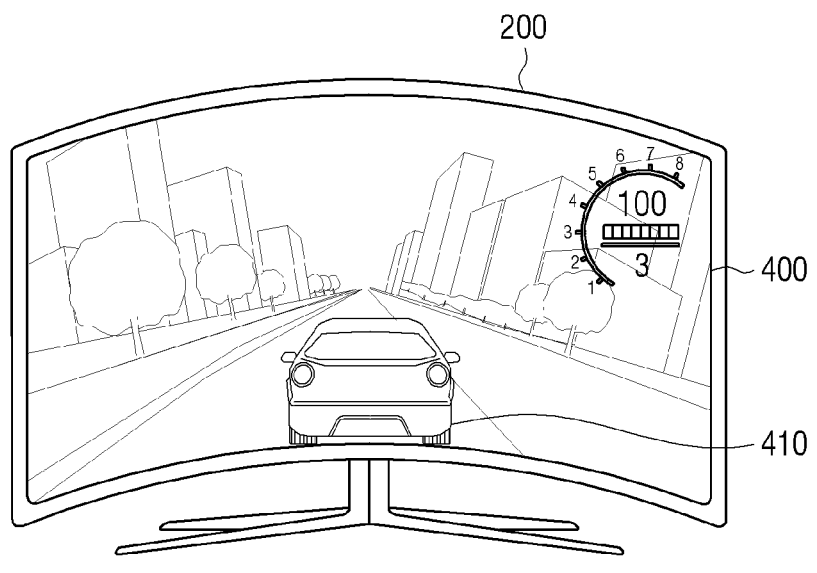
Figure 4C:
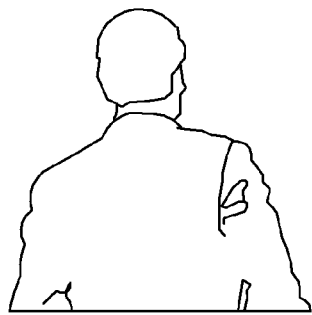

FIGS. 4A through 4C are views illustrating a change in a curvature of a display 400 according to a speed of an object of a racing game content.

If a speed of an object 410 is minimum, the display 400 is changed into a flat state as shown in FIG. 4A. If the speed of the object 410 gradually increases, the display 400 is gradually bent as shown in FIG. 4B. If the speed of the object 410 reaches a maximum speed, the display 400 is bent to have a maximum curvature value as shown in FIG. 4C.

As described above, in the present exemplary embodiment, a curvature of a display may be changed to have a curvature value corresponding to a speed of an object with a change in the speed of the object.

Figure 5A:
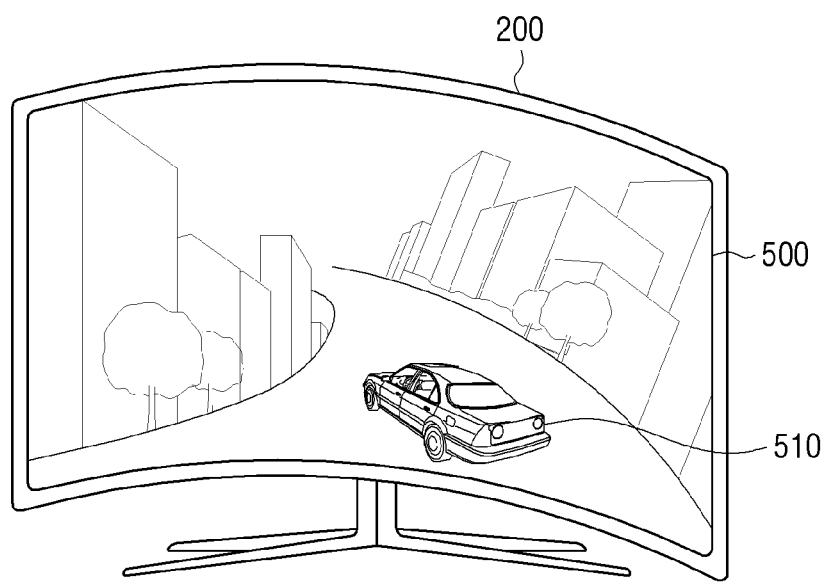
Figure 5A:
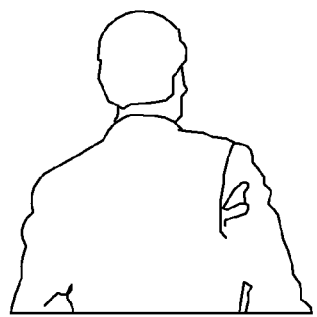
Figure 5B:
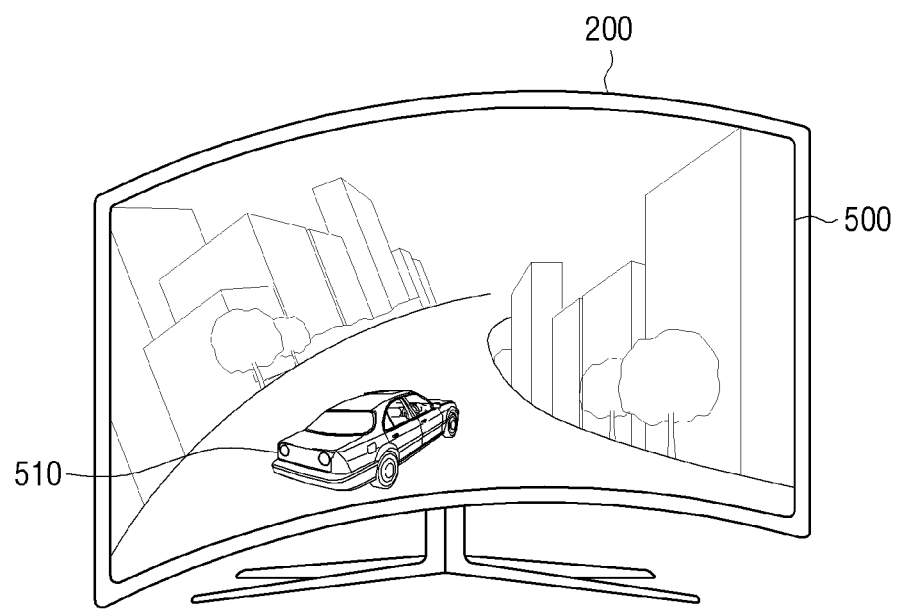
Figure 5B:
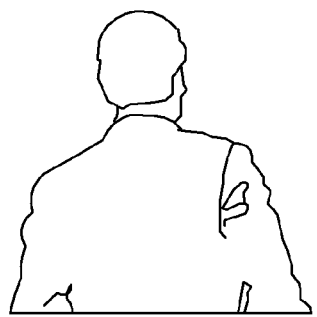

FIGS. 5A and 5B are views illustrating a change in a curvature of a display 500 according to a movement direction of an object of a racing game content.

If an object 510 moves to a left side, a right side of the display 500 may be relatively more bent than a left side of the display 500 as shown in FIG. 5A. If the object 510 moves to a left side, the left side of the display 500 may be relatively more bent than the right side of the display 500.

As described above, in the present exemplary embodiment, left and right sides of a display may be bent to have different curvature values according to directions into which an object moves according to changes in a movement direction of the object.

Figure 6:
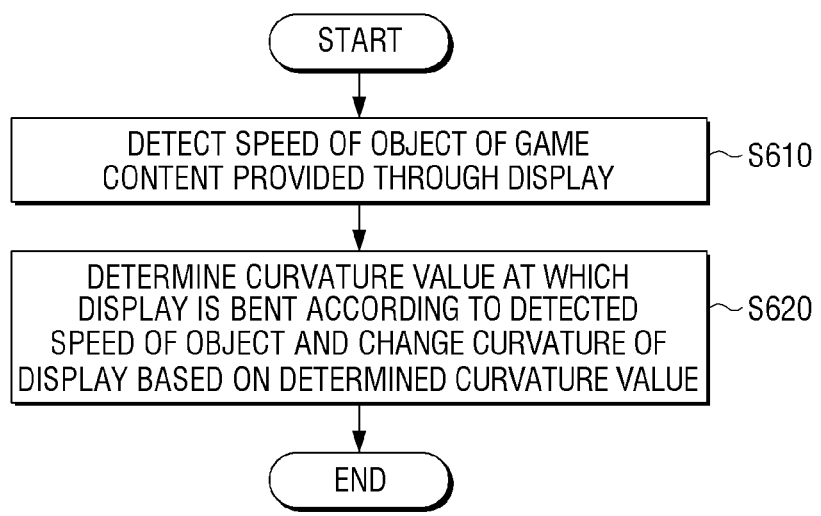
FIG. 6 is a flowchart of a method of bending a display of a display apparatus according to an exemplary embodiment of the present general inventive concept.

FIG. 6 is a flowchart of a method of bending a display of a display apparatus according to an exemplary embodiment of the present general inventive concept. Here, the display apparatus may include the display that is bendable.

In operation S610, a speed of an object of a game content provided through the display is detected. Here, the game content may be a racing game content, and the object may be an object having a speed that is changeable in the racing game content according to a user command.

In detail, a speed indicating GUI included on a game content screen may be analyzed to detect the speed of the object.

In operation S620, a curvature value at which the display is bent is determined according to the determined speed of the object, and a curvature of the display is changed based on the determined curvature value.

Here, the speed of the object may be detected for a preset time, and a curvature value may be determined by using the speed of the object detected for the preset time.

In detail, a speed interval between minimum and maximum speeds of the object detected for a preset time may be mapped on a curvature interval between minimum and maximum curvature values of the display. Also, the curvature of the display may be changed based on a curvature value mapped on the detected speed of the object according to the mapping result.

The curvature of the display may be changed so as to enable left and right sides of the display to have different curvature values according to a movement direction of the object.

Here, if the object moves to the left side, the curvature of the display may be changed so as to enable the right side of the display to have a larger curvature value than the left side of the display. If the object moves to the right side, the curvature of the display may be changed so as to enable the right side of the display to have a larger curvature value than the right side of the display.

A detailed method of changing a curvature of a display according to a speed and a movement direction of an object has be described above.

There may be provided a non-transitory computer readable medium that stores a program sequentially performing a method of bending a display according to the present general inventive concept.

For example, there may be provided a non-transitory computer readable medium that stores a program performing: detecting a speed of an object of a game content provided through a display; and determining a curvature value at which the display is bent according to the detected speed of the object and changing a curvature of the display based on the determined curvature value.

The non-transitory computer-readable medium refers to a medium which does not store data for a short time such as a register, a cache memory, a memory, or the like but semi-permanently stores data and is readable by a device. In detail, the above-described applications or programs may be stored and provided on a non-transitory computer readable medium such as a CD, a DVD, a hard disk, a blue-ray disk, a universal serial bus (USB), a memory card, a ROM, or the like.

Also, communications between elements of the display apparatus may be performed through the bus. Also, each device may further include a processor such as a central processing unit (CPU), a microprocessor, or the like performing the above-described various operations.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus, comprising:
a display configured to have a curvature that is changeable;
a curvature motor; and
a processor configured to:
identify a speed value of an object and a movement direction of the object in a content displayed on the display,
determine a curvature value of the display by which a left side curvature of the display and a right side curvature of the display are to be changed respectively by the curvature motor based on the identified speed value of the displayed object, and the identified movement direction of the object, and
control the curvature motor to bend the display to change the left side curvature of the display and the right side curvature of the display based on the determined curvature value.

2. The display apparatus of claim 1, wherein the content is of a game, and
the processor is configured to identify the speed value of the displayed object by analyzing a speed indicator of a graphic user interface (GUI) provided by the content.

3. The display apparatus of claim 1, wherein the processor is configured to identify the speed value of the displayed object for a time and determine the curvature value by using the speed value identified for the time.

4. The display apparatus of claim 3, wherein the processor is configured to map a speed interval between a minimum speed value and a maximum speed value of the object identified for the time on a curvature interval between a minimum curvature value and a maximum curvature value of the display, and change the curvature of the display based on a curvature value mapped to the identified speed value of the object.

5. The display apparatus of claim 1, wherein the processor is configured to change the curvature of the display so as to enable the right side curvature of the display to be larger than the left side curvature of the display while the object is moving to the left side, and
change the curvature of the display so as to enable the left side curvature of the display to be larger than the right side curvature of the display while the object is moving to the right side.

6. The display apparatus of claim 1, wherein the content is a racing game content, and the speed value of the object is changeable in the racing game content according to a user command.

7. The display apparatus of claim 1, wherein the speed value of the displayed object is identified corresponding to a portion of the content displayed on the display, the portion being most varied among portions of the content displayed on the display.

8. The display apparatus of claim 1, wherein the curvature value of the display is controlled to change in response with a change to the speed value of the object.

9. The display apparatus of claim 8, wherein the change to the speed value of the object occurs responsive to an input from a video game controller communicating with the display apparatus.

10. A method of changing a curvature of a display of a display apparatus including a curvature motor, the method comprising:
identifying a speed value of an object and a movement direction of the object in a content displayed on the display;
determining a curvature value of the display by which a left side of the curvature of the display and a right side curvature of the display are to be changed respectively by the curvature motor based on the identified speed value of the displayed object and the identified movement direction of the object; and
controlling, by a processor, the curvature motor to bend the display to change the left side curvature of the display and the right side curvature of the display based on the determined curvature value.

11. The method of claim 10, wherein the content is of a game, and the identifying of the speed value of the displayed object comprises:
analyzing a speed indicator of a GUI provided by the content to identify the speed value of the displayed object.

12. The method of claim 10, wherein the identifying of the speed value comprises identifying the speed value of the displayed object for over a time, and
wherein the determining of the curvature value comprises determining the curvature value by using the speed value identified for the time.

13. The method of claim 12, wherein the bending of the display comprises:
mapping a speed interval between a minimum speed value and a maximum speed value of the object identified for the time on a curvature interval between a minimum curvature value and a maximum curvature value of the display, and changing the curvature of the display based on a curvature value mapped to the identified speed value of the object.

14. The method of claim 10, wherein the changing of the curvature of the display comprises:
changing the curvature of the display so as to enable the right side curvature of the display to be larger than the left side curvature of the display while the object is moving to the left side, and
changing the curvature of the display so as to enable the left side curvature of the display to be larger than the right side curvature of the display while the object is moving to the right side.

15. The method of claim 10, wherein the content is a racing game content, and the speed value of the object is changeable in the racing game content according to a user command.

16. A method of changing a curvature of a display of a display apparatus, including a curvature motor, the method comprising:
determining a value characteristic of an object in a content displayed on the display, the value characteristic of the object corresponding to a portion of the content most varied over a predetermined interval of time;
determining a curvature value of the display by which a let side curvature of the display and a right side curvature of the display are to be changed by the curvature motor, wherein the curvature value is determined by a change in the characteristic value; and
controlling, by a processor, the curvature motor to bend the display to change the left side curvature of the display and the right side curvature of the display based on the determined curvature value.

* * * * *